(12) United States Patent
Dobrinsky et al.

(10) Patent No.: US 10,107,944 B2
(45) Date of Patent: Oct. 23, 2018

(54) LIGHT EMITTING DEVICE FOR EMITTING DIFFUSE ULTRAVIOLET LIGHT

(71) Applicant: Sensor Electronic Technology, Inc., Columbia, SC (US)

(72) Inventors: Alexander Dobrinsky, Loudonville, NY (US); Michael Shur, Latham, NY (US)

(73) Assignee: Sensor Electronic Technology, Inc., Columbia, SC (US)

(*) Notice: Subject to any disclaimer, the term of this patent is extended or adjusted under 35 U.S.C. 154(b) by 59 days.

(21) Appl. No.: 15/444,799

(22) Filed: Feb. 28, 2017

(65) Prior Publication Data
US 2017/0248744 A1 Aug. 31, 2017

Related U.S. Application Data

(60) Provisional application No. 62/301,015, filed on Feb. 29, 2016.

(51) Int. Cl.
*G02B 5/02* (2006.01)
*G02B 6/122* (2006.01)

(52) U.S. Cl.
CPC .......... *G02B 5/0294* (2013.01); *G02B 5/0278* (2013.01); *G02B 6/122* (2013.01)

(58) Field of Classification Search
CPC ..... G02B 5/0294; G02B 5/0278; G02B 6/122

USPC .................... 250/493.1, 494.1, 504 R, 504 H
See application file for complete search history.

(56) References Cited

U.S. PATENT DOCUMENTS

| 5,165,772 A | 11/1992 | Wu |
| 5,295,047 A | 3/1994 | Windross |
| 5,590,945 A | 1/1997 | Simms |
| 5,835,661 A | 11/1998 | Tai et al. |
| 9,550,004 B2 | 1/2017 | Smetona et al. |
| 2008/0310169 A1* | 12/2008 | Chen ................ G02B 5/0242 362/311.06 |
| 2013/0004749 A1* | 1/2013 | Hao ....................... B32B 7/10 428/201 |
| 2016/0074548 A1* | 3/2016 | Dobrinsky ............... A61L 2/10 250/492.1 |
| 2017/0095585 A1 | 4/2017 | Smetona et al. |

* cited by examiner

*Primary Examiner* — Nicole Ippolito
(74) *Attorney, Agent, or Firm* — LaBatt, LLC

(57) ABSTRACT

A diffusive layer including a laminate of a plurality of transparent films is provided. At least one of the plurality of transparent films includes a plurality of diffusive elements with a concentration that is less than a percolation threshold. The plurality of diffusive elements are optical elements that diffuse light that is impinging on such element. The plurality of diffusive elements can be diffusively reflective, diffusively transmitting or combination of both. The plurality of diffusive elements can include fibers, grains, domains, and/ or the like. The at least one film can also include a powder material for improving the diffusive emission of radiation and a plurality of particles that are fluorescent when exposed to radiation.

20 Claims, 4 Drawing Sheets

LIGHT EMITTING DEVICE FOR EMITTING DIFFUSE ULTRAVIOLET LIGHT

REFERENCE TO RELATED APPLICATIONS

The current application claims the benefit of U.S. Provisional Application No. 62/301,015, which was filed on 29 Feb. 2016, and which is hereby incorporated by reference. Aspects of the invention described herein are related to U.S. Patent application Ser. No. 14/478,266, which was filed on 5 Sep. 2014, which is hereby incorporated by reference.

TECHNICAL FIELD

The disclosure relates generally to emitting devices, and more particularly, to a diffusive layer for an emitting device in order to improve diffusive light emission.

BACKGROUND ART

When using discrete light sources, such as light emitting diodes, to create an illumination effect, there is a need for blending the illumination created by these discrete light sources into a uniform lighting condition. For example, a linear array of discrete light sources will produce non-uniform emission which can be very detrimental for sterilization purposes.

Light guides made from a high refractive index material have been successfully employed to create a line of light from a point source. For example, one approach discloses an optical element that uses a total-internal reflection light guide to create a line of light from one or two light emitting diode point sources by internally reflecting the light along an axis, wherein beams of light escape the light pipe along the axis of the pipe. This form of lighting apparatus is designed such that the light guide is to be hidden inside a wall or panel. In addition, the length of the light line created is limited by the constraints on the length of the mold used to create the light guides. Other approaches also use total internal reflection to create a line of light from a point source. While these approaches achieve a sufficiently thin line of light, the length of the line is effectively limited and the light guides cannot be easily configured end-to-end to create a longer continuous line of light. Furthermore, these approaches use a very limited number of light sources, which in turn restricts the luminance and perceived visual brightness of the resulting line. The approaches use light guides to direct a point source of light into a line of light, so each approach is limited on luminance. As such, a line of light with high luminance and sufficient length cannot be achieved. An additional drawback is the fact that only a single pattern is achievable with this type of display. Furthermore, for ultraviolet light emitting devices, long light guiding layers are expensive.

SUMMARY OF THE INVENTION

Aspects of the invention provide a diffusive layer including a laminate of a plurality of transparent films. At least one of the plurality of transparent films includes a plurality of diffusive elements with a concentration that is less than a percolation threshold. The plurality of diffusive elements are optical elements that diffuse light that is impinging on such element. The plurality of diffusive elements can be diffusively reflective, diffusively transmitting or combination of both. The plurality of diffusive elements can include fibers, grains, domains, and/or the like. The at least one film can also include a powder material for improving diffusive emission of radiation and a plurality of particles that are fluorescent when exposed to the radiation.

A first aspect of the invention provides a device, comprising: a set of radiation sources configured to emit radiation; and a diffusive layer located adjacent to the set of radiation sources, the diffusive layer including a plurality of transparent films, wherein at least one of the transparent films includes a plurality of diffusive elements, and wherein a concentration of the plurality of diffusive elements is below a percolation threshold.

A second aspect of the invention provides a device, comprising: a set of radiation sources configured to emit radiation; and a diffusive layer located adjacent to the set of radiation sources, the diffusive layer including a plurality of transparent films, wherein at least one of the transparent films is formed of a fluoropolymer and at least one of the transparent films is formed of a fluoropolymer composite material including a fluoropolymer and a plurality of diffusive elements, and wherein a concentration of the plurality of diffusive elements is below a percolation threshold.

A third aspect of the invention provides an enclosure, comprising: a plurality of radiation sources configured to emit radiation; a plurality of mirror elements, wherein each radiation source is located above a mirror element; and a diffusive layer located on a side of the enclosure opposite of the plurality of radiation sources, the diffusive layer including a plurality of transparent films, wherein at least one of the transparent films includes a plurality of diffusive elements, and wherein a concentration of the plurality of diffusive elements is below a percolation threshold.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
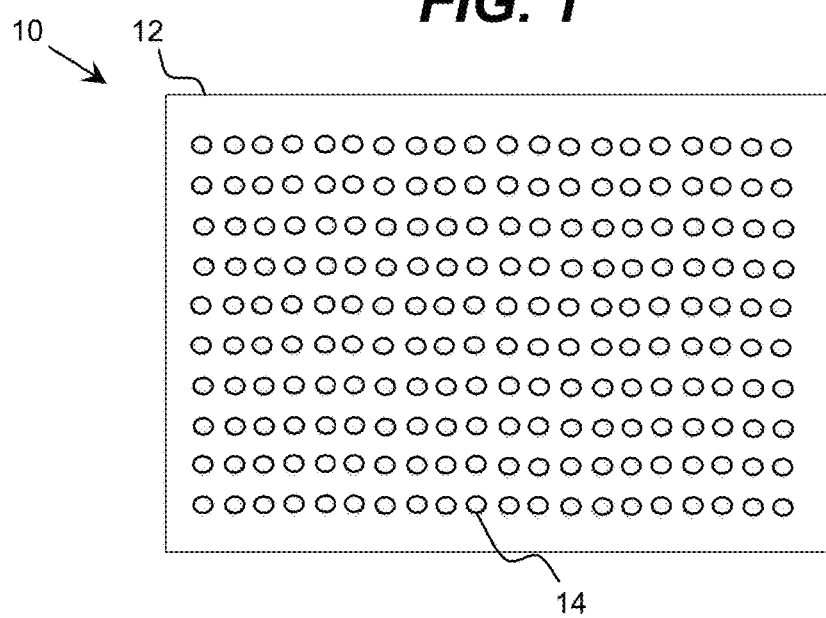
FIG. 1 shows an illustrative diffusive layer according to an embodiment.

As indicated above, aspects of the invention provide a diffusive layer including a laminate of a plurality of transparent films. At least one of the plurality of transparent films includes a plurality of diffusive elements with a concentration that is less than a percolation threshold. The plurality of diffusive elements are optical elements that diffuse light that is impinging on such element. The plurality of diffusive elements can be diffusively reflective, diffusively transmitting or combination of both. The plurality of diffusive elements can include fibers, grains, domains, and/or the like. The at least one film can also include a powder material for improving diffusive emission of radiation and a plurality of particles that are fluorescent when exposed to the radiation.

As used herein, unless otherwise noted, the term "set" means one or more (i.e., at least one) and the phrase "any solution" means any now known or later developed solution. Furthermore, as used herein, ultraviolet radiation/light means electromagnetic radiation having a wavelength ranging from approximately 10 nanometers (nm) to approximately 400 nm, while ultraviolet-C (UV-C) means electromagnetic radiation having a wavelength ranging from approximately 100 nm to approximately 280 nm, ultraviolet-B (UV-B) means electromagnetic radiation having a wavelength ranging from approximately 280 to approximately 315 nanometers, and ultraviolet-A (UV-A) means electromagnetic radiation having a wavelength ranging from approximately 315 to approximately 400 nanometers.

It is understood that, unless otherwise specified, each value is approximate and each range of values included herein is inclusive of the end values defining the range. As used herein, unless otherwise noted, the term "approximately" is inclusive of values within +/− ten percent of the stated value, while the term "substantially" is inclusive of values within +/− five percent of the stated value. Unless otherwise stated, two values are "similar when the smaller value is within +/− twenty-five percent of the larger value. A value, y, is on the order of a stated value, x, when the value y satisfies the formula $0.1x \leq y \leq 10x$. As used herein, a "characteristic size" of an object corresponds to a measurement of the physical size of the object that defines its influence on a system.

As also used herein, a layer is a transparent layer when the layer allows at least ten percent of radiation having a target wavelength, which is radiated at a normal incidence to an interface of the layer, to pass there through. Furthermore, as used herein, a layer is a reflective layer when the layer reflects at least ten percent of radiation having a target wavelength, which is radiated at a normal incidence to an interface of the layer. In an embodiment, the target wavelength of the radiation corresponds to a wavelength of radiation emitted or sensed (e.g., peak wavelength +/−five nanometers) by an active region of an optoelectronic device during operation of the device. For a given layer, the wavelength can be measured in a material of consideration and can depend on a refractive index of the material.

Turning to the drawings, FIG. 1 shows an illustrative diffusive layer 10 according to an embodiment. The diffusive layer 10 can be used to diffusively reflect radiation emitted from a set of light emitting diodes (not shown) located adjacent to the diffusive layer 10. In an illustrative embodiment, the diffusively reflected ultraviolet radiation can be used to disinfect a set of articles. In an embodiment, the diffusive layer 10 can be used to diffusively reflect radiation from other emitters, such as a high intensity ultraviolet lamp (e.g., a high intensity mercury lamp), a discharge lamp, super luminescent LEDs, laser diodes, and/or the like. The set of light emitting diodes can be manufactured with one or more layers of materials selected from the group-III nitride material system (e.g., $Al_xIn_yGa_{1-x-y}N$, where $0 \leq x$, $y \leq 1$, and $x+y \leq 1$ and/or alloys thereof).

The diffusive layer 10 comprises a transparent film 12 or a plurality of transparent films 12 with at least one film including a plurality of diffusive reflective or transmitting elements 14. In an embodiment, the plurality of transparent films 12, and therefore the diffusive layer 10, can have a transparency of at least 30% to radiation directed perpendicular to the surface of the plurality of transparent films 12. The plurality of transparent films 12 can be merged together though any process. For example, the plurality of transparent films 12 can be merged together using a melting process, which can include, but is not limited to placing the plurality of transparent films 12 in an oven and heating the plurality of transparent films 12 to a temperature that leads to the plurality of films melting. In another embodiment, the diffusive layer 10 can comprise an alloy or mixture of several fluoropolymer films. Each of the plurality of transparent films 12 can comprise a fluoropolymer, such as Teflon®, fluorinated ethylene-propylene (EFEP), ethylene-tetrafluoroethylene (ETFE), and/or the like. In an embodiment, more than one polymer material can be used to fabricate the diffusive layer 10.

In an embodiment, at least one transparent film in the plurality of transparent films 12 includes a plurality of diffusively reflecting or transmitting elements 14. In an embodiment, the plurality of diffusively reflecting or transmitting elements 14 can be immersed within the at least one transparent film. It is understood that the plurality of diffusively reflecting or transmitting elements 14 can be located in any portion of the at least one transparent film (e.g., on the surface of the at least one film, partially embedded within a top or bottom surface of the at least one film, or completely embedded within the at least one film). In an embodiment, at least one film in the plurality of transparent films 12 is a light guiding layer. The plurality of reflecting elements 14 can comprise grains, domains, fibers, elongated fibers, spheres, and/or the like. In an embodiment, the plurality of diffusively reflecting or transmitting elements 14 can be formed of fibers that form a periodic structure. In an embodiment, a concentration (e.g., density) of the plurality of diffusively reflecting or transmitting elements 14 is below a percolation threshold. This is to ensure that the plurality of diffusively reflecting elements 14 do not form a large cluster of physically touching elements. In an embodiment, small clusters of physically touching elements 14 can be formed. A characteristic size (e.g., diameter) of each small cluster is at most 5% of the characteristic size of the plurality of the diffusively reflecting or transmitting elements 14. The plurality of diffusively reflecting elements 14 can be in an ordered or random arrangement. In an embodiment, the concentration of the plurality of diffusively reflecting elements 14 can be periodically spatially modulated, with the modulation period comparable to or larger than the peak wavelength of the emitted radiation from the set of light emitting diodes (not shown). In an embodiment, the plurality of diffusively reflecting elements 14 comprise fibers and the distance between the fibers is on the order of the peak wavelength of the emitted radiation.

The plurality of diffusively reflecting elements 14 can comprise any shape, such as spheres, cubes, rectangles, triangles, and/or the like. For example, in FIG. 1, the plurality of diffusively reflecting elements 14 are sphere shaped. The plurality of diffusively reflecting elements 14 can be formed of silicon dioxide ($SiO_2$), aluminum oxide ($Al_2O_3$), magnesium fluoride ($MgF_2$), calcium fluoride ($CaF_2$), zinc oxide (ZnO), aluminum zinc oxide (AlZnO), and/or the like, with a characteristic size that is larger than or comparable to the peak wavelength of the emitted radiation from the set of light emitting diodes (not shown), where comparable means the deviation from the peak wavelength by less than an order of magnitude. In an embodiment, the characteristic size of the plurality of diffusively reflecting elements 14 is larger by an order of magnitude than the peak wavelength of the emitted radiation and the at least one transparent film including the plurality of diffusively reflecting elements 14 can include a powder material immersed within the at least one film. In an embodiment, the powder material acts as diffusive reflective or transmitting centers. The powder material can comprise $SiO_2$, $Al_2O_3$, $MgF_2$, $CaF_2$, aluminum, polytetrafluoroethylene (PTFE), a highly ultraviolet reflective expanded polytetrafluoroethylene (ePTFE) membrane (e.g., GORE® Diffuse Reflector Material), and/or the like. In an embodiment, the distribution of the powder material and the plurality of diffusively reflecting elements 14 is selected along with the position of the set of light emitting diodes (not shown) to achieve a distribution of intensity of radiation that varies throughout the surface of the diffusive layer 10 by no more than 50%.

In an embodiment, several of the films in the plurality of transparent films 12 can include a plurality diffusively reflecting elements 14. In an embodiment, each film can include a specific type of element 14 (e.g., fibers, grains, domains, and/or the like) with a specific material type, a specific characteristic size, a specific shape, and a specific arrangement with a characteristic separation distance. For example, a first film in the plurality of transparent films 12 can include a plurality of $SiO_2$ spheres, while a second film can include a plurality of prolonged aluminum reflective filaments (e.g., fibers).

Figure 2:
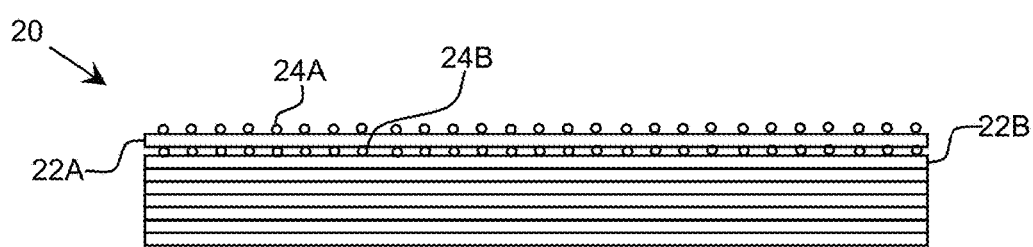
FIG. 2 shows an illustrative diffusive layer according to an embodiment.

Turning now to FIG. 2, an illustrative diffusive layer 20 according to an embodiment is shown. The diffusive layer 20 can include a plurality of transparent films 22A, 22B. The first film 22A can include a first plurality of diffusively reflecting elements 24A located on a first side and a second plurality of diffusively reflecting elements 24B located on a second side. It is understood that the first plurality of diffusively reflecting elements 24A and the second plurality of diffusively reflecting elements 24B can be the same or different. For example, a film in the plurality of transparent films 22A can include a plurality of $SiO_2$ spheres 24A on a first side and a plurality of $SiO_2$ spheres 24B on a second side. It is understood that although the plurality of spheres 24A, 24B are shown in the surface of the first film 22A and the second film 22B, as mentioned herein, the plurality of spheres 24A, 24B can be partially or completely embedded within both or either one of the first and second films 22A, 22B. Although the first plurality of diffusively reflecting elements 24A are shown as aligned with the second plurality of diffusively reflecting elements 24B, it is understood that the relative position of the plurality of diffusively reflecting elements 24A, 24B can be shifted to be not aligned with one another.

Figure 3:
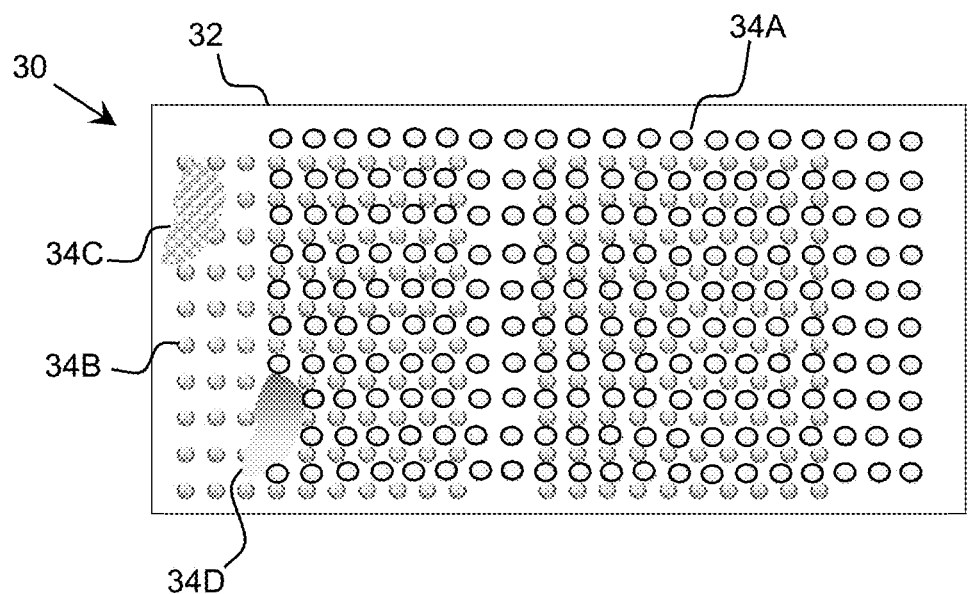
FIG. 3 shows an illustrative diffusive layer according to an embodiment.

Turning now to FIG. 3, an illustrative diffusive layer 30 according to an embodiment is shown. The diffusive layer 30 can include a transparent film 32 in the plurality of transparent films including multiple types of a plurality of elements 34A-D. Each of the plurality of elements 34A-D can be a different type of element. For example, the transparent film 32 can include a plurality of diffusive spheres 34A in parallel with a plurality of diffusive spheres 34B. The plurality of diffusive spheres 34A, 34B can be reflective and/or transmitting. The transparent film 32 can also include a plurality of partially reflective, partially transparent domains 34C. In an embodiment, the plurality of partially reflective, partially transparent domains 34C can comprise, for example, a fluoropolymer, such as polytetrafluoroethylene (PTFE) (e.g., Teflon®), and/or the like, film of varying thickness. The variation of thickness is such that the film transparency is maintained in regions transparent to UV radiation. In an embodiment, the transparency of the film is at least 30%. The reflective regions of the film can be of any desirable thickness, but should generally be on the same order of magnitude as the thickness of the transparent regions. The transparent film 32 can also include a plurality of domains 34D with variable reflective properties due to variation in the density of the aluminum reflective particles (e.g., aluminum powder) within each domain 34D.

Regardless, it is understood that for each plurality of elements 34A-D, the same or different materials can be used simultaneously. For example, $SiO_2$ can be used for one of the plurality of elements 34A-D, while $Al_2O_3$ can be used for another of the plurality of elements 34A-D. Furthermore, it is understood that the plurality of elements 34A-D can have the same or different shapes. For example, one of the plurality of elements 34A-D can comprise spheres, while the other of the plurality of elements 34A-D can comprise fibers. In addition, the transparent film 32, and any of the other embodiments of the diffusive layer discussed herein, can include a plurality of particles that are fluorescent under ultraviolet radiation in order to provide a visual indication of the ultraviolet radiation status and homogeneity. The fluorescent particles can include phosphorus, such as $Ca_5(PO_4)_3(F,Cl):Sb^{3+},Mn^{2+}$, and/or the like. In an embodiment, the concentration of the plurality of particles that are fluorescent under ultraviolet radiation can vary proportionally with the concentration of the plurality of elements 34A-D.

Figure 4:
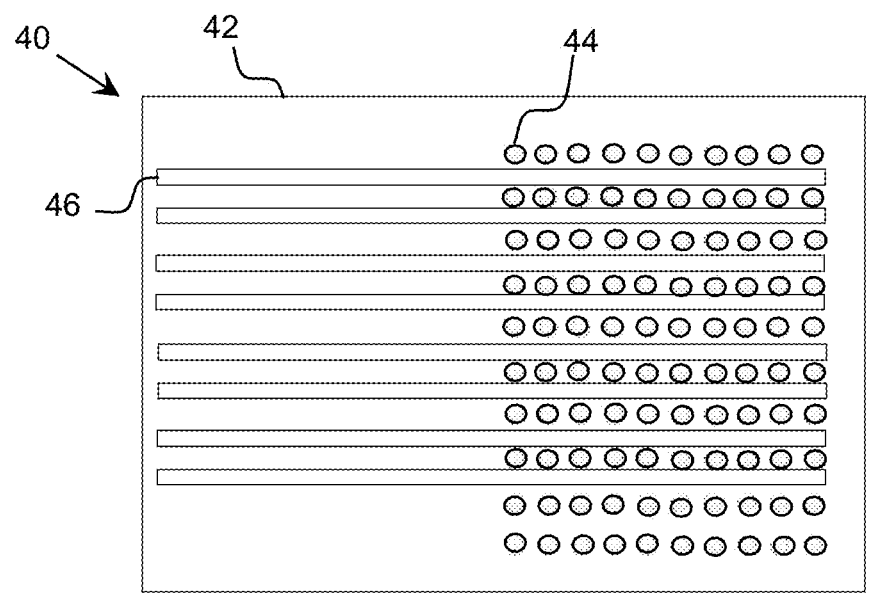
FIG. 4 shows an illustrative diffusive layer according to an embodiment.

Turning now to FIG. 4, an illustrative diffusive layer 40 according to an embodiment is shown. The diffusive layer 40 includes a plurality of transparent films 42, where at least one transparent film has a plurality of diffusive elements 44, as discussed herein with respect to the other embodiments. Although only one plurality of diffusive elements 44 are shown in the diffusive layer 40, it is understood that the diffusive layer 40 can include any number of plurality of diffusive elements 44, similar to the embodiment of the diffusive layer 30 shown in FIG. 3. In addition, the diffusive layer 40 can include a plurality of wave guiding structures 46. The plurality of wave guiding structures 46 can comprise an ultraviolet (UV) transparent material, such as $SiO_2$, $Al_2O_3$, and/or the like. The characteristic width of each of the plurality of wave guiding structures 46 is measurable in microns. For example, the width of each of the plurality of wave guiding structures 46 is approximately a few microns (e.g., 1-10 microns). Similar to optical fiber, each of the plurality of wave guiding structures 46 can comprise a core and a cladding layer (not shown). In an embodiment, the core layer and the cladding layer can be formed of different materials. The core layer can be formed of, for example, $Al_2O_3$, while the cladding layer is formed of, for example, $SiO_2$. In another example, the cladding layer can be $MgF_2$ and $CaF_2$. In an embodiment, the plurality of wave guiding structures 46 do not comprise optical fibers and can be larger light guiding structures that are capable of supporting a large number of light guiding modes. In operation, a set of light emitting diodes (not shown) can be positioned to direct and focus the radiation within these light guiding layers. The light guiding structures can be coupled (e.g., directly linked or within close proximity) to a film 42 including the plurality of diffusive elements 44.

Figure 5A:
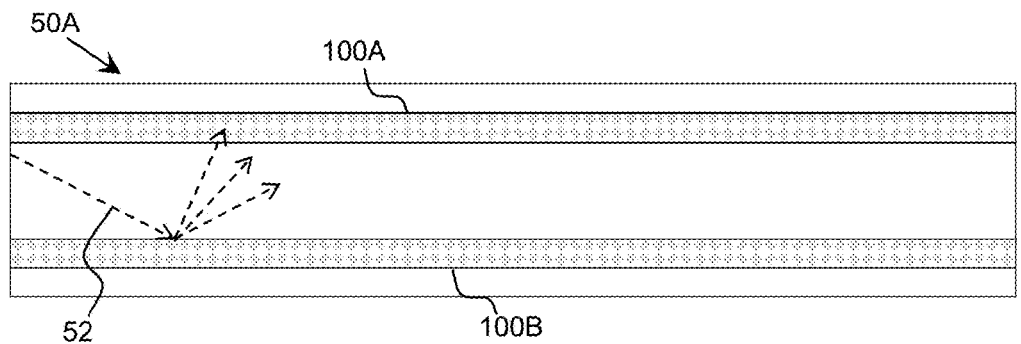
FIGS. 5A and 5B show illustrative system according to embodiments.
Figure 5B:
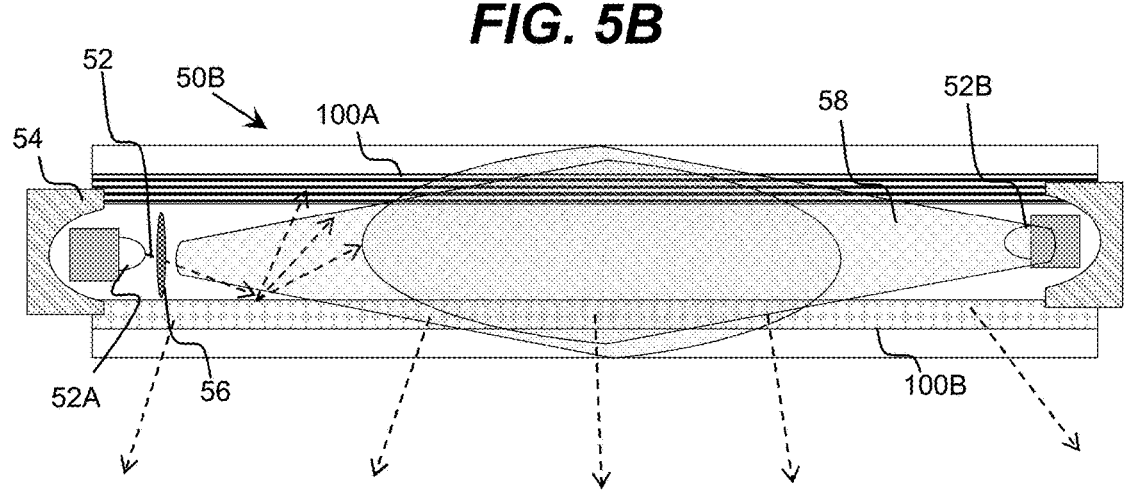

Turning now to FIGS. 5A-5B, illustrative devices 50A, 50B including a first diffusive layer 100A and a second diffusive layer 100B according to embodiments are shown. The first and second diffusive layers 100A, 100B can comprise any combination of features of diffusive layers described herein, such as the diffusive layers 10, 20, 30, 40 shown in FIGS. 1-4. The first and second diffusive layers 100A, 100B can be configured substantially identically, as shown in FIG. 5A, or the first and second diffusive layers 100A, 100B can be configured differently, as shown in FIG. 5B.

As shown in FIG. 5B, the device 50B can include a set of light emitting diodes 52A, 52B that are positioned adjacent to the diffusive layers 100A, 100B of the device 50B. For example, the set of light emitting diodes 52A, 52B can be positioned at the sides of the device 50B. In an embodiment, the set of light emitting diodes 52A, 52B can include optical reflectors 54 and/or optical lenses 56 to create the angular distribution of radiation 58 which allows for a uniform distribution of intensity over and through the diffusive layer 100B. In the embodiment shown in FIG. 5B, the first diffusive layer 100A is reflective and can comprise a composite material with reflective properties. For example, the diffusive layer 100A can include a PTFE fluoropolymer film with a plurality of aluminum fibers. Alternatively, the diffusive layer 100A can include a highly ultraviolet reflective expanded polytetrafluoroethylene (ePTFE) membrane (e.g., GORE® Diffuse Reflector Material), and/or the like. The second diffusive layer 100B is transparent and comprise at least one transparent film with a plurality of diffusive elements, as discussed herein.

Figure 6:
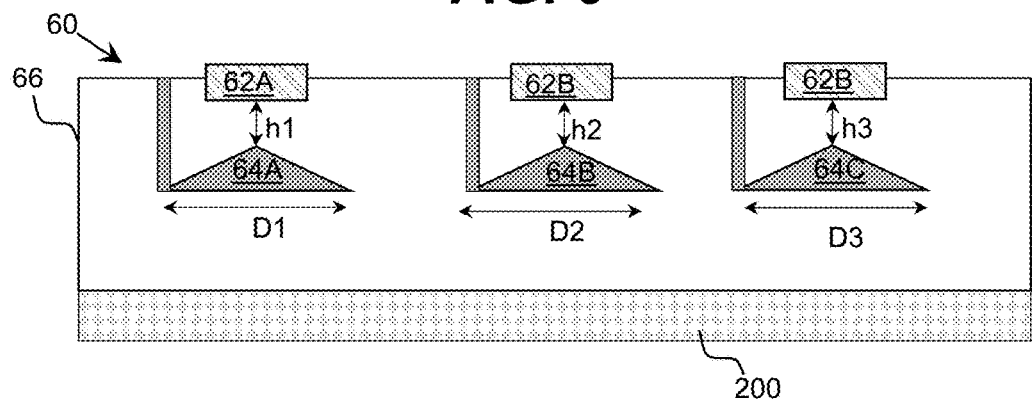
FIG. 6 shows an illustrative device according to an embodiment.

Turning now to FIG. 6, an illustrative device 60 according to an embodiment is shown. The device 60 includes a plurality of UV sources 62A-C that are each located a distance h1, h2, h3 above a respective mirror element 64A-C having a diameter D1-D3 within an enclosure 66. Further details of this device 60 are described in U.S. patent application Ser. No. 14/478,266. The mirror elements 64A-C are configured to scatter the radiation emitted from the UV sources 62A-C throughout the enclosure 66. As shown, the device 60 can include a diffusive layer 200 through which the scattered radiation exits the enclosure 66. The diffusive layer 200 can comprise any combination of features of diffusive layers described herein, such as one of the embodiments of the diffusive layers 10, 20, 30, 40 described in FIGS. 1-4. The position and size of the mirror elements 64A-C are selected to improve a uniformity of the radiation exiting the enclosure 66. In an embodiment, the mirror elements 64A-C can be partially transparent to UV radiation in order to improve the uniformity of the radiation beneath the mirror elements 64A-C.

Figure 7:
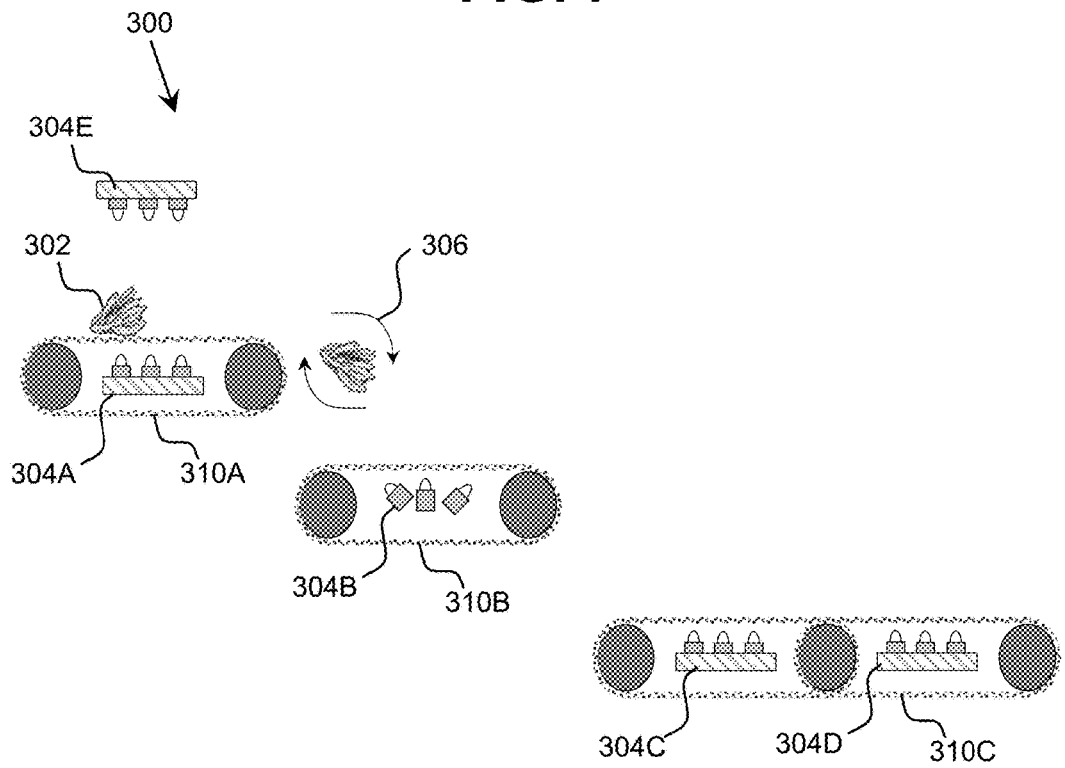
FIG. 7 shows an illustrative system according to an embodiment.

Turning now to FIG. 7, an illustrative system 300 according to an embodiment is shown. The system 300 can include a plurality of conveyor belts 310A-C, which are used to move a set of items 302 from one conveyor belt 310A-C to another in order to disinfect the set of items 302. During movement of the set of items 302 from a first conveyor belt 310A to a second conveyor belt 310B, it is understood that the set of items 302 may rotate 306 in order to improve disinfection of all the surfaces of the set of items 302. Each of the plurality of conveyor belts 310A-C can comprise any combination of features of diffusive layers described herein, such as one of the diffusive layers 10, 20, 30, 40 discussed in FIGS. 1-4. In an embodiment, at least one set of ultraviolet radiation sources 304A-D can be located within the conveyor belts 310A-C. A set of ultraviolet radiation sources 304E can also be located above the conveyor belt 310A. It is understood that a set of ultraviolet radiation sources can be located above the other conveyor belts 310B, 310C.

It is understood that in any of the embodiments discussed herein, the diffusive layer can be part of a sterilization system. The sterilization system can include a feedback control system used to measure the fluorescence of the set of items being disinfected. The feedback control system can change the UV radiation intensity, distribution, and/or the like, depending on the status of the set of items being disinfected.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A device, comprising:
a set of radiation sources configured to emit radiation; and
a diffusive layer located adjacent to the set of radiation sources, the diffusive layer including a plurality of transparent films, wherein at least one of the transparent films includes a plurality of diffusive elements, and wherein a concentration of the plurality of diffusive elements is below a percolation threshold.

2. The device of claim 1, wherein a characteristic size of the plurality of diffusive elements is comparable to or larger than a peak wavelength of the emitted radiation.

3. The device of claim 1, wherein the at least one transparent film includes a second plurality of diffusive elements.

4. The device of claim 1, wherein the at least one transparent film includes a plurality of transparent elements, a plurality of partially reflective, partially transparent domains, and a plurality of domains with variable reflective properties.

5. The device of claim 1, wherein the at least one transparent film includes a set of wave guiding structures, wherein each of the wave guiding structures is formed of a core layer and a cladding layer.

6. The device of claim 1, wherein the at least one transparent film includes a powder material, and wherein the powder material comprises an ultraviolet transparent material.

7. The device of claim 1, wherein the at least one transparent film includes a plurality of particles that fluoresce when exposed to ultraviolet radiation.

8. A device, comprising:
a set of radiation sources configured to emit radiation; and
a diffusive layer located adjacent to the set of radiation sources, the diffusive layer including a plurality of transparent films, wherein at least one of the transparent films is formed of a fluoropolymer and at least one of the transparent films is formed of a fluoropolymer composite material including a fluoropolymer and a plurality of diffusive elements, and wherein a concentration of the plurality of diffusive elements is below a percolation threshold.

9. The device of claim 8, wherein a characteristic size of the plurality of diffusive elements is comparable to or larger than a peak wavelength of the emitted radiation.

10. The device of claim 8, wherein the at least one transparent film formed of the fluoropolymer composite material includes a second plurality of diffusive elements.

11. The device of claim 8, wherein the at least one transparent film formed of the fluoropolymer composite material includes a plurality of transparent elements, a plurality of partially reflective, partially transparent domains, and a plurality of domains with variable reflective properties.

12. The device of claim 8, wherein the at least one transparent film formed of the fluoropolymer composite material includes a set of wave guiding structures, wherein each of the wave guiding structures is formed of a core layer and a cladding layer.

13. The device of claim 8, wherein the at least one transparent film formed of the fluoropolymer composite material includes a powder material, and wherein the powder material comprises an ultraviolet transparent material.

14. The device of claim 8, wherein the at least one transparent film formed of the fluoropolymer composite material includes a plurality of particles that fluoresce when exposed to ultraviolet radiation.

15. An enclosure, comprising:
   a plurality of radiation sources configured to emit radiation;
   a plurality of mirror elements, wherein each radiation source is located above a mirror element; and
   a diffusive layer located on a side of the enclosure opposite of the plurality of radiation sources, the diffusive layer including a plurality of transparent films, at least one of the transparent films includes a plurality of diffusive elements, and wherein a concentration of the plurality of diffusive elements is below a percolation threshold.

16. The enclosure of claim 15, wherein a characteristic size of the plurality of diffusive elements is comparable to or larger than a peak wavelength of the emitted radiation.

17. The enclosure of claim 15, wherein the at least one transparent film includes a plurality of transparent elements, a plurality of partially reflective, partially transparent domains, and a plurality of domains with variable reflective properties.

18. The enclosure of claim 15, wherein the plurality of mirror elements are partially transparent to the emitted radiation.

19. The enclosure of claim 15, wherein the at least one transparent film includes a set of wave guiding structures, wherein each of the wave guiding structures is formed of a core layer and a cladding layer.

20. The enclosure of claim 15, wherein the at least one transparent film includes a plurality of particles that fluoresce when exposed to ultraviolet radiation.

\* \* \* \* \*